Figure 1:
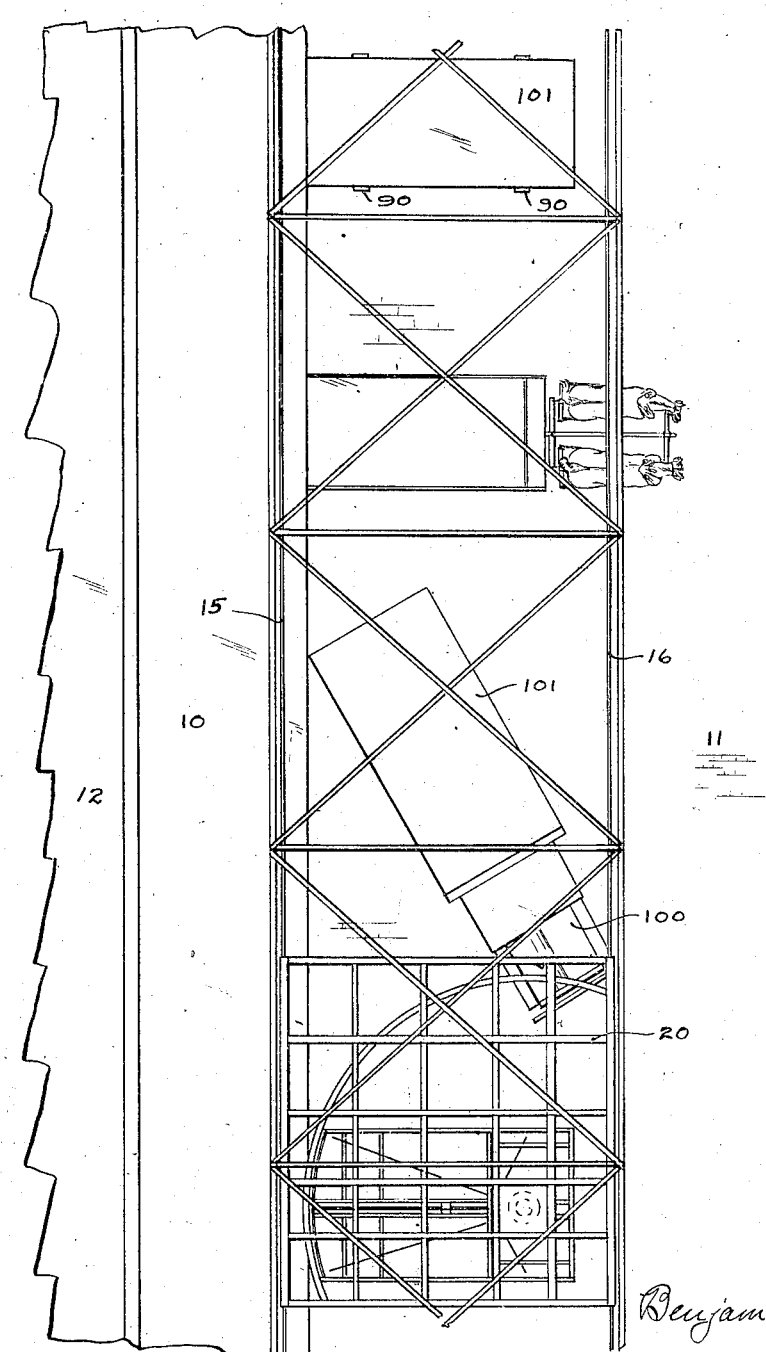

Aug. 31, 1926.

B. F. FITCH 1,597,779

HOISTING MECHANISM

Filed Dec. 26, 1924

6 Sheets-Sheet 1

Aug. 31, 1926.

B. F. FITCH 1,597,779

HOISTING MECHANISM

Filed Dec. 26, 1924      6 Sheets-Sheet 2

Aug. 31, 1926.

B. F. FITCH 1,597,779

HOISTING MECHANISM

Filed Dec. 26, 1924

6 Sheets-Sheet 3

Inventor

Benjamin F. Fitch,

By Baker, Mecklin, Goodrich & Fear,

Attorneys

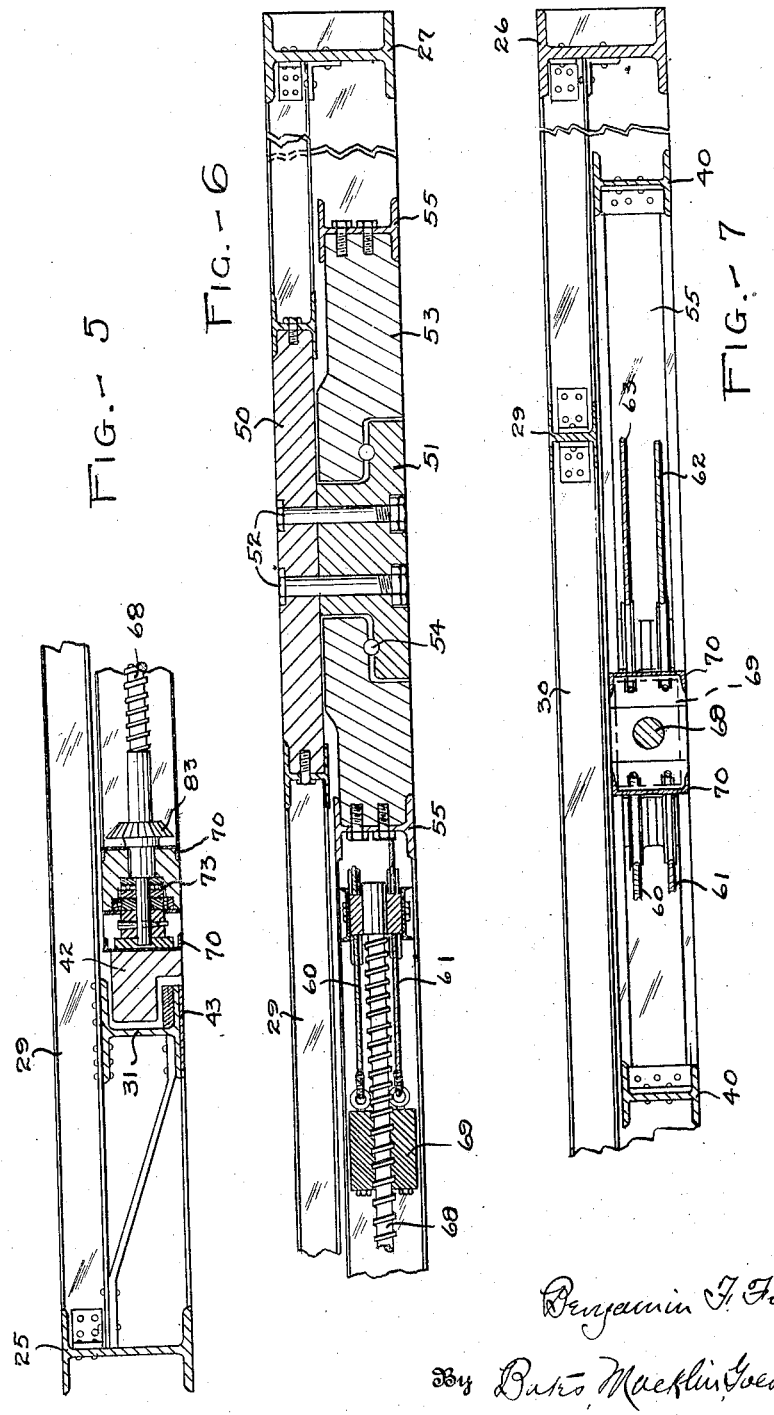

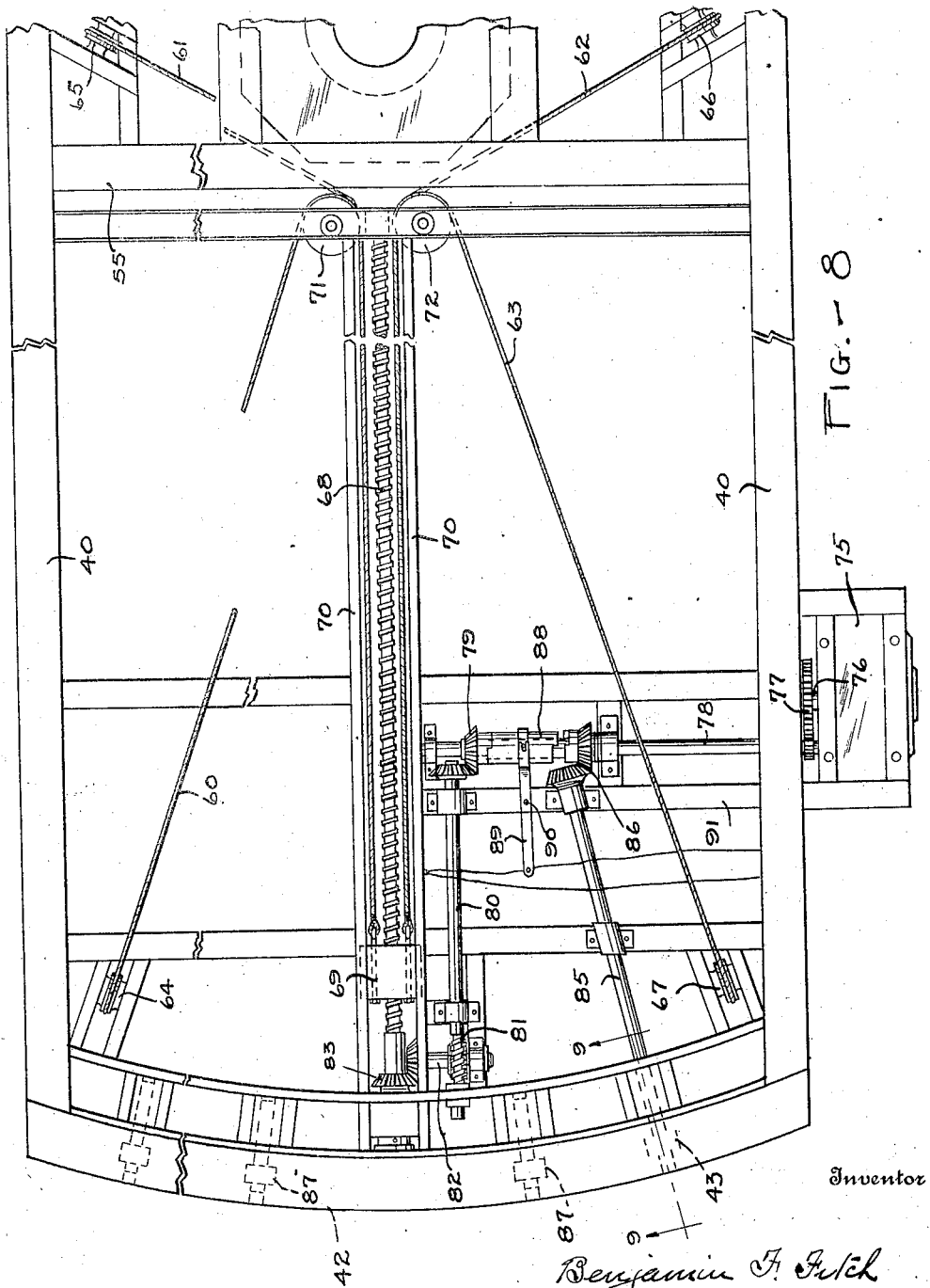

Patented Aug. 31, 1926.

1,597,779

UNITED STATES PATENT OFFICE.

BENJAMIN F. FITCH, OF GREENWICH, CONNECTICUT.

HOISTING MECHANISM.

Application filed December 26, 1924. Serial No. 758,019.

The handling of freight by the use of removable automobile bodies can be readily accomplished where station platforms are disposed alongside wide streets. In narrow streets, however, the length of the truck prohibits the turning thereof so as to position the body at right angles to the station platform and yet leave sufficient space for the normal flow of traffic along the street. Accordingly, trucks can only be brought at an oblique angle to the platform, which of course leaves the end of the body away from the edge of the platform and hinders the transfer of freight between the platform and body.

One of the objects of my invention, therefore, is the provision of an overhead crane which is so arranged with relation to the street and platform that a truck may be driven at an oblique angle to a platform alongside a narrow street, whereupon the body may be raised from the truck and then turned so as to bring the end thereof close to the edge of the platform. In this connection my invention contemplates the use of a crane which is so constructed that it is not necessary to span the entire street in order to effect such movement of a body with reference to a truck.

A further problem in the handling of removable automobile bodies is the fact that existing station platforms are frequently within buildings having low ceilings or are accompanied by overhanging portions of buildings or roofs which preclude the use of an overhead crane requiring more than about a 12" overall depth. My invention therefore also contemplates the use of an overhead crane which may be used for the purpose above set forth, yet which has a very low over-all depth and which is therefore well adapted for use over existing thoroughfares without necessitating expensive changes in the building construction.

I carry out the above objects by employing an overhead crane which may extend over a public thoroughfare and adjacent the station platform. The crane preferably embodies a main frame which moves longitudinally of the platform and a supplemental frame which is carried within the main frame and is arranged to be turned therein, so that the total depth of the crane structure is substantially that of the main frame. The supplemental frame carries the load engaging and hoisting mechanism, wherefore a removable automobile body may be raised from a motor vehicle positioned beneath the crane runway, then swung with reference to the platform and transported if necessary along the platform to a place where it is convenient to again turn the supplemental frame so as to bring the load at right angles to the platform.

Figure 2:
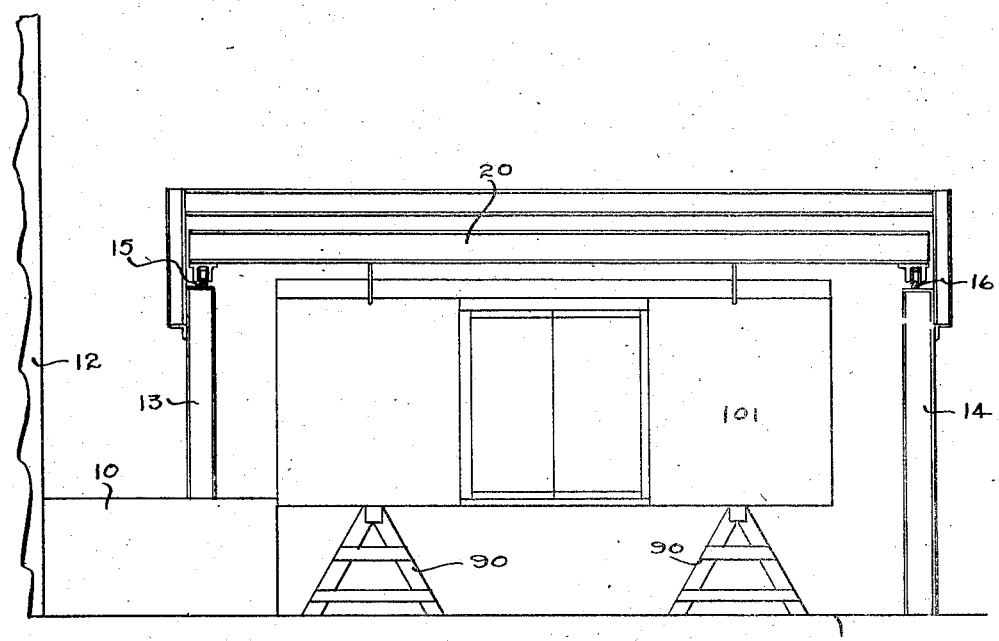
Figure 5:
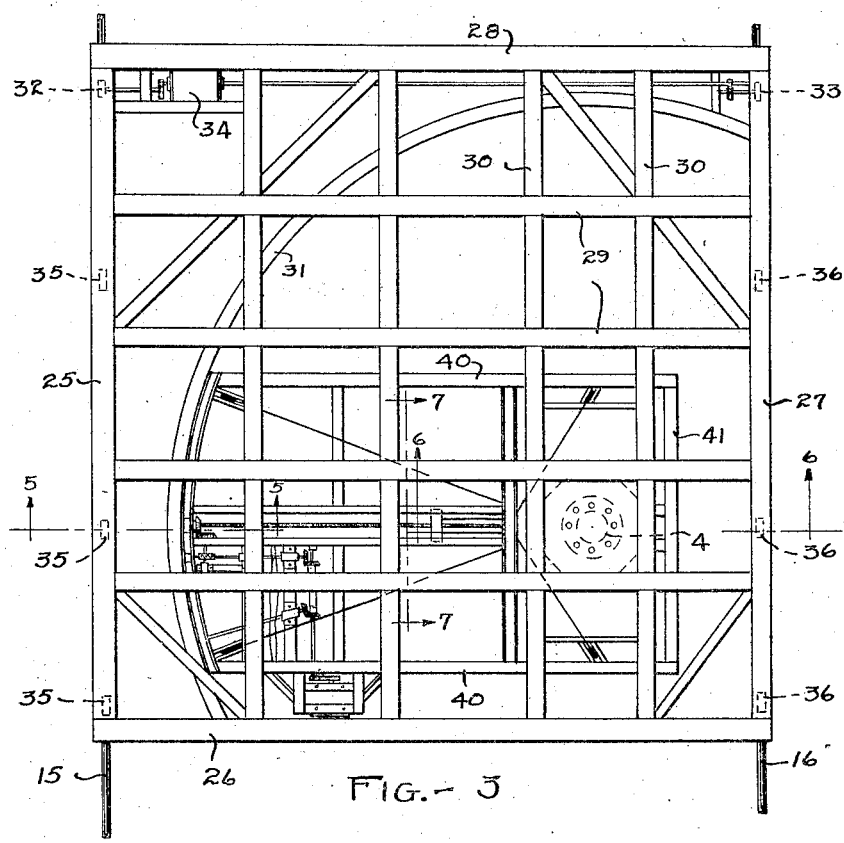
Figure 9:
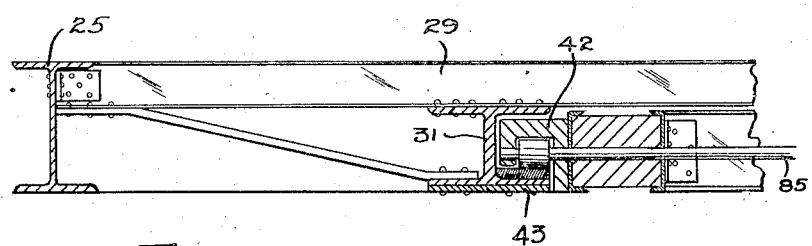
Figure 4:
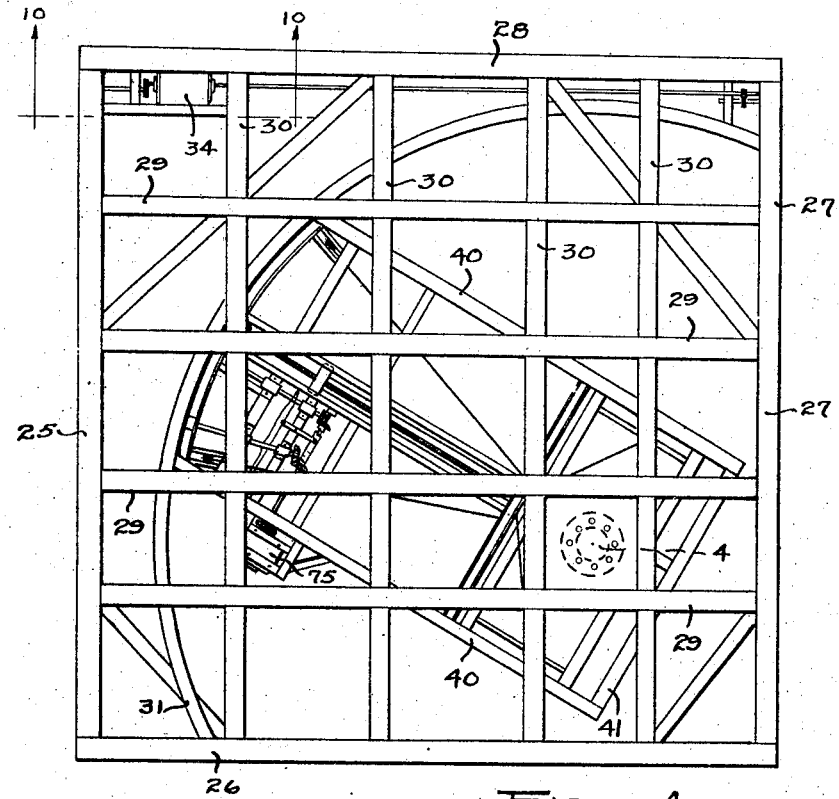
Figure 10:
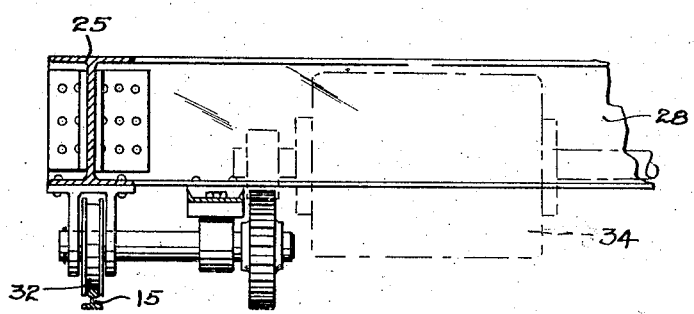

The preferred means for carrying out my invention is illustrated in the drawings, wherein Fig. 1 is a diagrammatic view illustrating my invention when used with a station adjacent on a narrow street; Fig. 2 is an end elevation of the apparatus shown diagrammatically in Fig. 1; Fig. 3 is a plan view of a crane constructed in accordance with the present invention; and illustrating one position of the supplemental frame with reference to the main frame; Fig. 4 is a similar plan view illustrating another position of the supplemental frame with reference to the main frame; Figs. 5, 6 and 7 are sections on an enlarged scale taken on the lines 5—5, 6—6 and 7—7 respectively in Fig. 3; Fig. 8 is a plan view on an enlarged scale showing the supplemental frame; Fig. 9 is a section taken on the line 9—9 in Fig. 8; Fig. 10 is a section taken on the line 10—10 in Fig. 4.

In Figs. 1 and 2 I have illustrated a station platform 10 as being disposed intermediate a street 11 and a building 12, the platform extends longitudinally of the street and projects outwardly as shown over the curbing on one side of the street. Columns 13 and 14 are shown as supporting tracks 15 and 16 respectively on which an overhead crane is adapted to travel. The space between the rows of columns therefore, provides a crane runway and permits vehicles to be brought into convenient position for enabling the tranfer of freight between the truck bodies and platform.

The crane illustrated in the drawings embodies a main frame indicated in general at 20, and a supplemental frame within it, indicated in general at 21. The supplemental frame is disposed within the main frame and is arranged to be turned with reference thereto. Means are provided for enabling the main frame to travel along the trackway and other means are provided for turning the supplemental frame with reference to the main frame. In addition, load engaging and hoisting mechanism is mounted on the supplemental frame.

To enable the supplemental frame to be carried within the main frame and thereby to reduce the overall depth of the crane to a minimum, I have shown the main frame as embodying a rectangular frame having enclosing members 25, 26, 27 and 28. This frame may be reinforced by beams 29, and 30 respectively. The main frame also supports a curved trackway 31 on which the supplemental frame is arranged to turn.

To propel the main frame along the trackway, I have illustrated wheels 32 and 33 as engaging the tracks 15 and 16 respectively, and as being operatively connected to a motor 34. Idler wheels 35 and 36 cooperate with the wheels 32 and 33 in supporting the load.

The supplemental frame is also indicated embodying a frame having longitudinal members 40 which are connected at one end by a transverse member 41 and at the other end by a curved transverse member 42. The supplemental frame may be supported within the main frame by wheels 43 which travel on the curved trackway 31. As shown, the trackway embodies the lower flange of a curved I-beam, while the upper flange of the I-beam is connected at spaced intervals to some of the members 29 and 30 respectively. The supplemental frame is also supported in such manner as to swing about a pivot 45.

The arrangement of the pivotal connection between the main and supplemental frames is best illustrated in Fig. 6 wherein the main frame has a supporting block 50 which is carried between some of the beams 29 and 30. The block 50 is shown as supporting a member 51 by securing members 52, while the supplemental frame is shown as having a block 53 which coacts with the member 51, preferably through the medium of a ball or roller bearing 54. To support the block 53, I have indicated the supplemental frame as having beams 55, which extend transversely of the supplemental frame and are attached to the longitudinal beams 40. The supplemental frame is therefore adapted to swing about a pivot which is disposed on one side of the center of the main frame.

The supplemental frame supports the hoisting mechanism which is illustrated particularly in Fig. 8 as comprising flexible load engaging members 60, 61, 62 and 63 which extend over 64, 65, 66 and 67 respectively. The sheaves therefore are arranged to define a rectangle, wherefore cables may engage a removable automobile body at four points.

To raise and lower the cables as a unit, I have shown a screw and nut couple embodying a rotatable threaded shaft 68 and a nut 69 which is arranged to travel in guideways 70. The cables are attached to the nut and are led around sheaves 71 and 72 adjacent one end of the threaded shaft. The load stresses on the shaft are counteracted by a thrust bearing indicated at 73 in Fig. 5. The position of the bearing thus enables the shaft to be placed under tension. This eliminates difficulties incident to deflection of the shaft while in operation.

To rotate the shaft 68, I have indicated, in Fig. 8, a motor 75, the armature shaft of which is illustrated at 76. Gearing 77 transmits rotation of the shaft 76 to rotation of shaft 78, while beveled gearing 79 transmits rotation of shaft 78 to shaft 80. A worm and worm wheel connection indicated at 81, effects rotation of shaft 82 upon rotation of shaft 80, while gearing 83 causes actuation of the threaded shaft 68 whenever the shaft 82 is rotated. This arrangement of gearing effects a material reduction in speed between the motor and the threaded shaft 68, while the worm and the worm wheel connection 81 cooperates with the screw and nut couple to provide a lock for enabling a load to be suspended when the motor is stopped.

To turn the supplemental frame with reference to the main frame, I have indicated a shaft 85 which is operatively connected to shaft 78 by gearing 86 and which carries a wheel 43 at the outer end thereof. In Fig. 9 the shaft 85 is indicated as being supported on both sides of the wheel by the member 42. Other wheels indicated at 87 may be idler wheels and may be employed for cooperating with the wheel 43 to support the load and the supplemental frame.

To effect selective operation of the screw and nut couple independently of the shaft 85, I have shown a clutch sleeve 88 in Fig. 8 as being splined to the shaft 78 and as being disposed between cooperating clutch members associated with the gears 79 and 86 respectively. A shipper lever 89 may be pivotally mounted at 90 on a transverse supporting beam 91 for enabling the sleeve to be brought into engagement with either the gearing 79 or 86. Accordingly, the gearing is normally freely rotatable on the shaft 78 in the usual manner.

Assuming that a motor vehicle 100 having a loaded removable body 101 thereon is brought beneath the truck runway and at an oblique angle to the platform then the main frame is brought approximately over the truck while the supplemental frame is turned with reference to the main frame until the vertical reaches of the load engaging cables are approximately directly in line with the members on the body which are to be engaged by the cables. If this vertical alignment is not accurate, then the frames may be shifted slightly, or the truck operator may move the vehicle a slight distance so that the load may be readily engaged. As soon as the load is engaged then the motor 75 is actuated, and the clutch sleeve 88 is moved so as to actuate the gearing 79 for imparting rotation to the threaded shaft 68. As soon as the load is raised sufficiently to clear the sides of the truck, then the clutch sleeve is moved out of engagement with the member which actuates the gearing 79 and is forced into engagement with the clutch member which actuates the shaft 85.

By employing a reversible motor then the direction in which the supplemental frame is to be swung can be readily controlled. Assuming now that the load has been raised then if necessary the motor 34 may be started to move the main frame together with the suspended load along the runway. When the load is brought opposite the desired location then the motor 34 is stopped and movement of the main frame is arrested. Thereupon, the supplemental frame is turned with reference to the main frame until the frame assumes a position shown in Fig. 3. Thereupon the load can be lowered and deposited upon supports 90 so as to extend at right angles to the platform.

An important advantage of this invention is the fact that one frame may be employed for handling the movable bodies and for shifting them in a convenient manner without interfering with the normal flow of traffic along a narrow street. Moreover this arrangement obviates the necessity for having a crane which spans the entire street. By employing a supplemental frame which may be turned with reference to the main frame and may lie within horizontal planes which bound the upper and lower surfaces of the main frame, I obtain a crane which may be used beneath low ceilings, roofs, canopies or projections without necessitating extensive changes in the construction thereof.

Having thus described my invention, I claim:—

1. In a crane, the combination with an overhead traveling main frame, of a supplemental frame carried by and mounted within the main frame, the supplemental frame being mounted to swing within the main frame upon a vertical pivot.

2. In a crane, the combination with a main frame, of a supplemental frame carried within the main frame, the supplemental frame having a pivotal connection adjacent one end thereof with the main frame, there being a curved trackway within the main frame for supporting the opposite end of the supplemental frame.

3. In a crane, the combination with a main frame, of a supplemental frame carried within the main frame and arranged to turn about a pivot with reference to the main frame, the pivotal connection between the main and supplemental frames being disposed on one side of the mid position of the main frame.

4. In a crane, the combination with a main frame, of a supplemental frame carried within the main frame, there being a pivotal connection between the main and supplemental frames, such pivotal connection being disposed near one end of the supplemental frame and to one side of the central portion of the main frame.

5. In a crane, the combination with an overhead traveling main frame, of a supplemental frame mounted within the main frame so as to turn about a vertical pivot, the pivotal connection being disposed on one side of the central portion of the main and supplemental frames respectively.

6. In a crane, the combination with a main frame, having a curved trackway carried within it, and a supplemental frame pivotally mounted within the main frame, the pivotal connection being disposed adjacent one end of the supplemental frame, the other end of the supplemental frame being supported by the trackway, said pivotal connection being located near a corner of the main frame, whereby the supplemental frame may turn substantially a quarter of a revolution with reference to the main frame.

7. In a crane, the combination of a main frame, of a supplemental frame carried by and mounted within the main frame in such manner as to lie between planes which bound the top and bottom of the main frame, means for enabling the supplemental frame to be turned horizontally with reference to the main frame, and hoisting mechanism carried by the supplemental frame, such mechanism lying substantially within planes which bound the top and bottom of the supplemental frame.

8. In a crane, the combination with a main frame, of a supplemental frame carried within the main frame and mounted to turn in a horizontal plane with reference thereto, a screw and nut couple carried within the supplemental frame, means for actuating one member of the couple, and load engaging members operatively connected to the other member of said couple, said members leading outwardly from the screw and nut couple to spaced points on the supplemental frame.

9. In a crane, the combination with a main frame, of a curved trackway carried thereby, a supplemental frame having one end thereof supported by the curved trackway, there being a pivotal connection between the supplemental and main frames adjacent the other end of the supplemental frame, and a hoisting mechanism carried by the supplemental frame and including four cables, said cables depending from the supplemental frame so as to define a rectangle, and said pivotal connection being disposed approximately upon one of the sides of said rectangle.

10. In a crane, the combination with a main frame, of a supplemental frame disposed within the main frame, there being a pivotal connection between said frames, a hoisting mechanism including a screw and nut couple carried by the supplemental frame, means for operating one member of said couple, cables attached to the other member of said couples and leading outwardly therefrom, sheaves supported adjacent the corners of a theoretic rectangle by the supplemental frame, said cables extending over said sheaves, the axis of said pivotal connection lying substantially in a plane passing through two of the cables and occupying one side of the rectangle.

11. In a crane, the combination with a substantially rectangular frame of a supplemental frame lying substantially between planes defining the top and bottom of the main frame and within it, a curved trackway carried by the main frame, the supplemental frame having wheels engaging said trackway, and means for rotating at least one of said wheels to turn the supplemental frame with reference to the main frame, the axis upon which the supplemental frame is turned being disposed adjacent one end of the supplemental frame and to one side of the central portion of the main frame.

12. In a crane, the combination of a rectangular overhead main frame, a curved trackway carried thereby adjacent two of the sides of the frame which meet at a corner, a supplemental frame pivoted to the main frame, near the opposite corner and carried at its free end by the curved trackway, raising members depending from the supplemental frame, and means for operating the raising members.

13. The combination of a main frame, a supplemental frame pivoted near one end to the main frame, a curved trackway carried by the main frame and supporting the other end of the supplemental frame, a pair of sheaves respectively on opposite sides of the pivot of the supplemental frame, a pair of sheaves spaced apart and located adjacent the free end of the supplemental frame, hoisting mechanism mounted on the supplemental frame and four cables leading therefrom, and depending over the four sheaves mentioned.

14. In a crane, the combination with an overhead traveling main frame, a supplemental frame pivoted near one end to the main frame, a curved trackway carried by the main frame and supporting the other end of the supplemental frame, a horizontally disposed rotatable screw mounted in the supplemental frame radially thereof, means for rotating the screw, sheaves on opposite sides of the screw adjacent that end thereof which is adjacent the pivot of the supplemental frame, a traveling nut on the screw, four cables leading therefrom and passing about the sheaves mentioned, and diverging in four directions, and four other sheaves respectively located at the four corners of a rectangle on the supplemental frame, said cables passing downwardly over said last mentioned sheaves.

In testimony whereof, I hereunto affix my signature.

BENJAMIN F. FITCH.